US012646213B2

(12) United States Patent
Berry et al.

(10) Patent No.: US 12,646,213 B2
(45) Date of Patent: Jun. 2, 2026

(54) TECHNIQUES FOR EXTRINSIC SENSOR CALIBRATION USING MOBILE DEVICE

(71) Applicant: Caterpillar Inc., Peoria, IL (US)

(72) Inventors: Jeffrey K. Berry, Clayton, NC (US); Nolan Graves, Peoria, IL (US); Maxwell T. Eastepp, San Francisco, CA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/771,437

(22) Filed: Jul. 12, 2024

(65) Prior Publication Data

US 2026/0017824 A1 Jan. 15, 2026

(51) Int. Cl.
| | |
|---|---|
| *G06T 19/00* | (2011.01) |
| *G06F 3/01* | (2006.01) |
| *G06T 7/73* | (2017.01) |
| *G06T 7/80* | (2017.01) |
| *G06T 19/20* | (2011.01) |
| *E02F 9/26* | (2006.01) |

(52) U.S. Cl.
CPC .................. *G06T 7/80* (2017.01); *E02F 9/26* (2013.01); *G06T 2200/24* (2013.01); *G06T 2207/20092* (2013.01); *G06T 2207/30204* (2013.01); *G06T 2207/30252* (2013.01)

(58) Field of Classification Search
CPC .................. G06T 7/80; G06T 2200/24; G06T 2207/20092; G06T 2207/30204; G06T 2207/30252; E02F 9/26
See application file for complete search history.

(56) References Cited

U.S. PATENT DOCUMENTS

| | | | |
|---|---|---|---|
| 5,748,505 | A | 5/1998 | Greer |
| 8,918,302 | B2 | 12/2014 | Hukkeri et al. |
| 9,279,670 | B2 | 3/2016 | Schommer et al. |
| 10,846,868 | B1 * | 11/2020 | Wang ........................ G06T 7/33 |
| 11,024,065 | B1 * | 6/2021 | Baron ................... G06T 19/006 |
| 2019/0304131 | A1 * | 10/2019 | Gesner ................. G01B 11/005 |
| 2019/0378303 | A1 * | 12/2019 | Shaw ........................ G06T 7/97 |
| 2021/0215505 | A1 * | 7/2021 | Castorena Martinez .................... G01D 18/00 |
| 2021/0291376 | A1 * | 9/2021 | Wang ........................ G06T 7/85 |

(Continued)

FOREIGN PATENT DOCUMENTS

| | | |
|---|---|---|
| DE | 102016224766 | 6/2018 |
| DE | 102018210352 | 1/2020 |

(Continued)

*Primary Examiner* — Zaihan Jiang

(57) ABSTRACT

Techniques are described for calibrating a coordinate frame of a remote sensing sensor of a perception system of a machine with respect to a coordinate frame of the machine. An application of a mobile device, such as a smartphone, a tablet computing device, or a laptop, or a web service detects a visual fiducial tag and a feature of the machine in an image by using an optical sensor of a digital camera system. The fiducial tag detection provides the coordinate transformation between the mobile device and a housing of the remote sensing sensor, e.g., radar sensor, lidar sensor, sonar sensor, or camera. Detecting a feature of the machine, e.g., a traction component such as a wheel or track, a brake light, a headlight, a turn signal, or a logo, provided constraints for the transformation between the device and machine.

15 Claims, 10 Drawing Sheets

(56) References Cited

U.S. PATENT DOCUMENTS

| | | | | |
|---|---|---|---|---|
| 2021/0316743 A1* | 10/2021 | Chang | ................... | G01S 13/865 |
| 2021/0318149 A1* | 10/2021 | Chang | ................... | G01S 13/867 |
| 2021/0318448 A1* | 10/2021 | Chang | ................... | G01S 5/0009 |
| 2022/0032547 A1* | 2/2022 | Ruiz-Vargas | .......... | B33Y 50/02 |
| 2022/0292796 A1* | 9/2022 | Xu | ........................... | G06T 7/73 |
| 2022/0342055 A1* | 10/2022 | Katou | ................... | G01S 7/4086 |
| 2023/0281873 A1 | 9/2023 | Engstle et al. | | |
| 2024/0104941 A1* | 3/2024 | Ren | ........................ | G06V 20/59 |

FOREIGN PATENT DOCUMENTS

| | | | |
|---|---|---|---|
| DE | 102019121552 | | 2/2021 |
| EP | 1091186 | | 4/2001 |
| WO | WO 2023081870 | * | 11/2022 |
| WO | WO 2025170759 | * | 1/2025 |

* cited by examiner

500

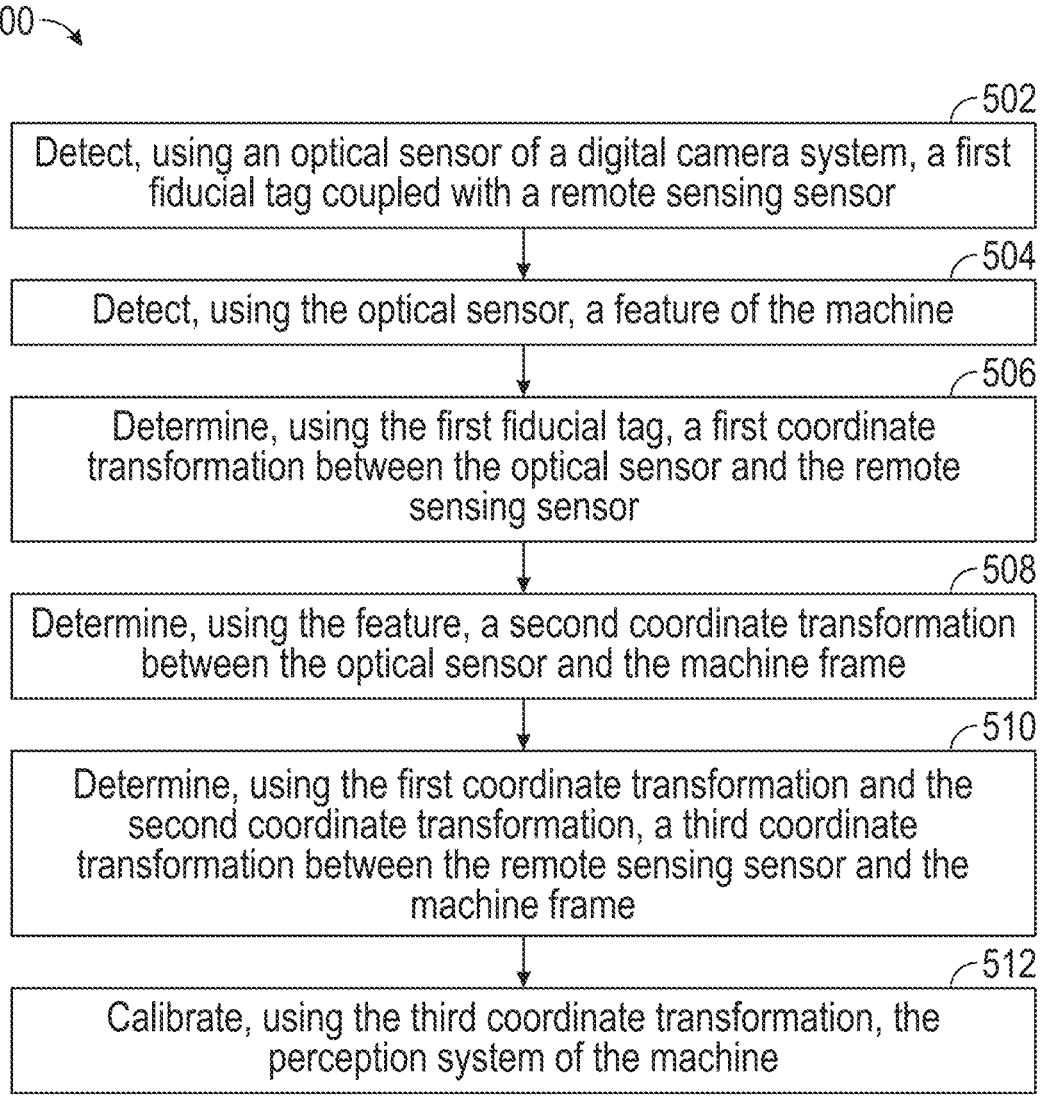

502

Detect, using an optical sensor of a digital camera system, a first fiducial tag coupled with a remote sensing sensor

504

Detect, using the optical sensor, a feature of the machine

506

Determine, using the first fiducial tag, a first coordinate transformation between the optical sensor and the remote sensing sensor

508

Determine, using the feature, a second coordinate transformation between the optical sensor and the machine frame

510

Determine, using the first coordinate transformation and the second coordinate transformation, a third coordinate transformation between the remote sensing sensor and the machine frame

512

Calibrate, using the third coordinate transformation, the perception system of the machine

FIG. 5

TECHNIQUES FOR EXTRINSIC SENSOR CALIBRATION USING MOBILE DEVICE

FIELD OF THE DISCLOSURE

This document pertains generally, but not by way of limitation, to techniques for calibrating a coordinate frame of a remote sensing sensor of a perception system of a machine with respect to a coordinate frame of the machine.

BACKGROUND

Perception systems are integral components in various fields, such as robotics, autonomous vehicles, and advanced manufacturing, playing an important role in how machines interpret and interact with their environment. These systems typically include remote sensing sensors, data processing units, and software algorithms that work together to perceive surroundings and make informed decisions based on sensory input. Common remote sensing sensors used in these systems include cameras, LiDAR (Light Detection and Ranging), radar, and ultrasonic sensors, as well as cameras, each providing different types of data used for comprehensive environmental understanding.

Reference frames are fundamental concepts in the field of mechanics and robotics, serving as the basis for describing the position and orientation of objects in space. In the context of remote sensing sensors and machines, a reference frame typically refers to a coordinate system that is used to define the spatial relationship of the sensor or machine components. For remote sensing sensors, the reference frame determines how sensory data is captured and interpreted relative to its own position and orientation. For machines, the reference frame is important for understanding the machine's position and movements within its operational environment.

U.S. Pat. No. 9,279,670 is directed to a method for adjusting and/or calibrating a surroundings sensor in a vehicle using a measuring unit and a calibration panel.

SUMMARY OF THE DISCLOSURE

This disclosure describes various techniques for calibrating a coordinate frame of a remote sensing sensor of a perception system of a machine with respect to a coordinate frame of the machine. An application of a mobile device, such as a smartphone, a tablet computing device, or a laptop, or a web service detects a visual fiducial tag and a feature of the machine in an image by using an optical sensor of a digital camera system. The fiducial tag detection provides the coordinate transformation between the mobile device and a housing of the remote sensing sensor, e.g., radar sensor, lidar sensor, sonar sensor, or camera. Detecting a feature of the machine, e.g., a traction component such as a wheel or track, a brake light, a headlight, a turn signal, or a logo, provided constraints for the transformation between the device and the machine.

In some aspects, this disclosure is directed to a computer-implemented method for calibrating a perception system of a machine, the method comprising: detecting, using an optical sensor of a digital camera system, a first fiducial tag coupled with a remote sensing sensor, wherein the remote sensing sensor is coupled with a machine frame of the machine; detecting, using the optical sensor, a feature of the machine; determining, using the first fiducial tag, a first coordinate transformation between the optical sensor and the remote sensing sensor; determining, using the feature, a second coordinate transformation between the optical sensor and the machine frame; determining, using the first coordinate transformation and the second coordinate transformation, a third coordinate transformation between the remote sensing sensor and the machine frame; and calibrating, using the third coordinate transformation, the perception system of the machine.

In some aspects, this disclosure is directed to a computer-implemented method for calibrating a perception system of a machine, the method comprising: detecting, using a first image generated by an optical sensor of a digital camera system, a first fiducial tag coupled with a remote sensing sensor and a second fiducial tag mounted on a machine frame of the machine, wherein the remote sensing sensor is coupled with the machine frame; detecting, using a second image generated by the optical sensor of the digital camera system, the second fiducial tag and a feature of the machine; determining, using the first fiducial tag and the second fiducial tag, a first coordinate transformation between the optical sensor and the remote sensing sensor; determining, using the second fiducial tag and the feature, a second coordinate transformation between the optical sensor and the machine frame; determining, using the first coordinate transformation and the second coordinate transformation, a third coordinate transformation between the remote sensing sensor and the machine frame; and calibrating, using the third coordinate transformation, the perception system of the machine.

In some aspects, this disclosure is directed to a remote sensing sensor assembly for a perception system of a machine, the remote sensing sensor assembly including a fiducial tag, the remote sensing sensor assembly comprising: a housing including: a surface including a first portion and a second portion, wherein the first portion defines a first plane and the second portion extends beyond the first plane; and a remote sensing sensor positioned within the housing.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

FIG. 5 illustrates a method for calibrating a perception system of a machine in accordance with one embodiment.

DETAILED DESCRIPTION

Figure 1:
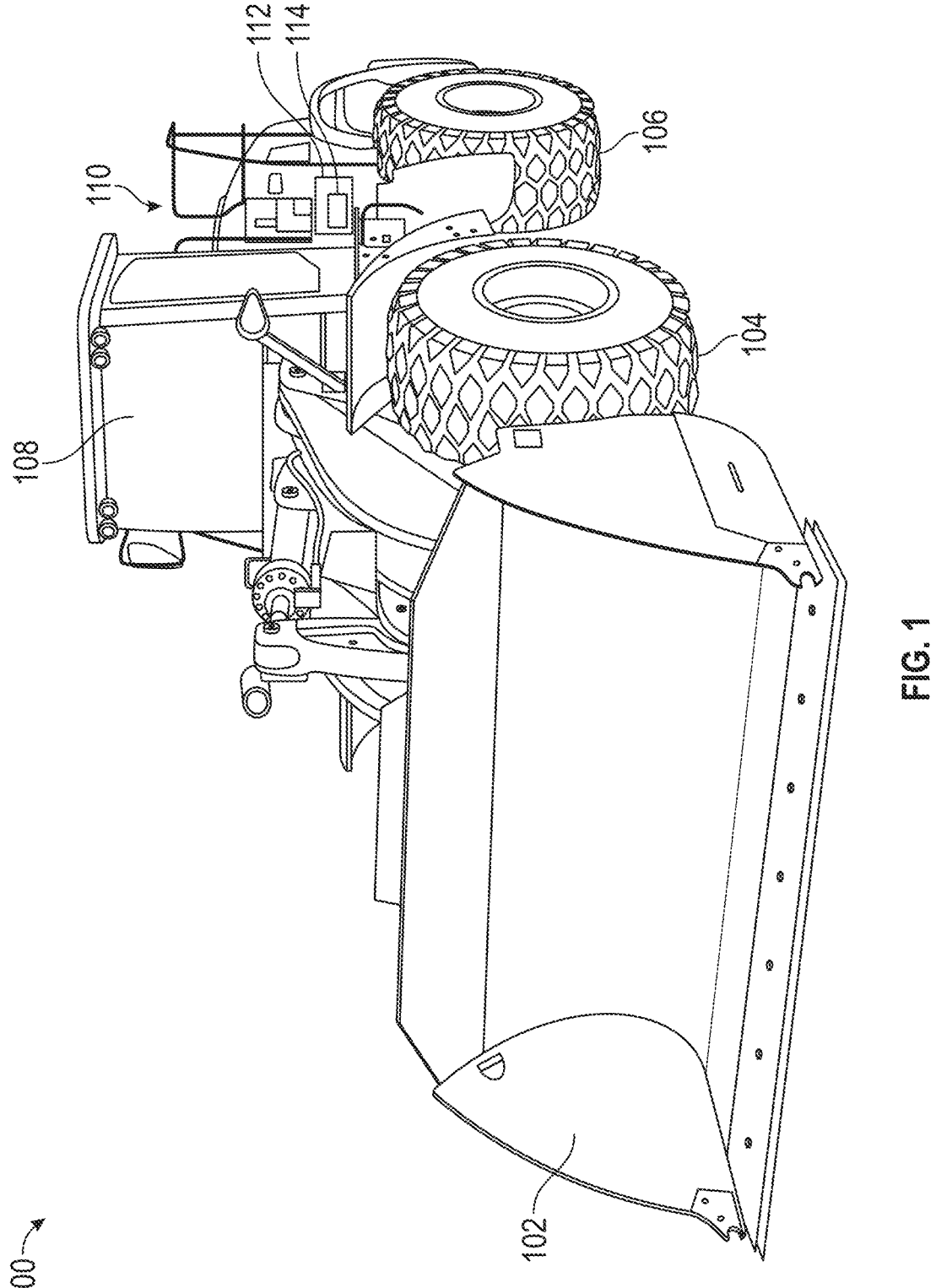
FIG. 1 is a front perspective view of an example of a machine that may implement various techniques of this disclosure.

For perception systems, including those used in collision detection and mitigation systems and systems in autonomous vehicles, to function accurately, it is essential that the sensor data may be transformed to the reference frame of the machine to which it is affixed. A reference frame may be understood as a set of axes and an origin from which the position of points and orientation of other axes are defined in space. The translation and rotation between the reference frame of a sensor and the reference frame of a machine to which it is mounted is known as the sensor's extrinsic calibration values. Sensor data is measured in the reference frame of the sensor and is transformed to the reference frame of the machine using the extrinsic calibration values. This transformation is important, ensuring that the data collected by the sensor may be accurately integrated and utilized in the machine's control systems, leading to precise and effective machine operations.

Incorrect coordinate frame transformation of sensor data may lead to data interpretation errors, impacting the machine's functionality and safety. For instance, in autonomous vehicles, incorrect transformation of sensor data can lead to incorrect assessments of obstacle distances and locations, potentially causing navigation errors. Therefore, maintaining consistent and correct extrinsic calibration values between sensors and machines is important for the optimal performance of advanced technological systems.

To address alignment issues, various calibration techniques may be used. These techniques involve procedures and algorithms designed to measure and correct misalignments between the sensor frame and the machine frames. Extrinsic calibration ensures that the sensor data, when transformed into the machine's reference frame, accurately represents the environment as it relates to the machine itself. This process might involve physical adjustments of the sensors, software corrections, or a combination of both. The goal is to achieve a high degree of precision in the sensor data interpretation, which is pivotal for the reliable performance of the machine's perception system.

Existing solutions involve expensive surveying equipment. The present inventors have recognized a need for a more affordable solution that is convenient and easily portable.

This disclosure describes techniques for calibrating a coordinate frame of a remote sensing sensor of a perception system of a machine with respect to a coordinate frame of the machine. Using various techniques of this disclosure, an application of a mobile device, such as a smartphone, a tablet computing device, or a laptop, or a web service detects a visual fiducial tag and a feature of the machine 100 in an image by using an optical sensor of a digital camera system. The fiducial tag detection provides the coordinate transformation between the mobile device and a housing of the remote sensing sensor, e.g., radar sensor, lidar sensor, sonar sensor, or camera. Detecting a feature of the machine 100, e.g., a traction component such as a wheel or track, a brake light, a headlight, a turn signal, or a logo, provided constraints for the transformation between the device and machine. A coordinate transformation is any subset of the three translation and three rotation variables.

In some examples, images captured by the optical sensor of the digital camera system from multiple vantage points fully constrain or define the digital camera system to the machine coordinate transformation. The housing of the remote sensing sensor or camera housing to the machine coordinate transformation is determined by combining the remote sensing sensor or camera to smartphone and smartphone to machine coordinate transformations.

FIG. 1 is a front perspective view of an example of a machine 100 that may implement various techniques of this disclosure. FIG. 1 depicts a non-limiting example of a machine 100 in the form of a load-haul-dump (LHD) vehicle, such as for mining, including a dump bucket 102, a traction component 104, a traction component 106, an operator control cabin 108, and a vehicle body 110. The traction component 104 and the traction component 106 may form part of a wheel-drive system, a track-drive system, or any other type of drive system configured to propel the machine 100. Examples of traction components include wheels, track(s), or a combination of wheels and one or more tracks. The machine 100 may be a mining truck or may alternatively embody an on-highway or off-highway machine or any other vehicle that is configured to be propelled. In some examples, the machine 100 may be battery-powered or hybrid-powered.

The machine 100 includes an electrical architecture 112. The electrical architecture 112 includes components of a perception system 114, such as a control system for a collision detection and mitigation system or system in an autonomous vehicle.

In battery-powered or hybrid-powered examples, the electrical architecture 112 may also include a DC power source, including but not limited to a battery module, which may supply power to, among other things, an electric motor. The electric motor may supply rotational power to one or more systems, such as a system configured to operate various hydraulics of the dump bucket 102. The techniques of this disclosure are not limited to battery-powered or hybrid-powered machines.

Figure 2:
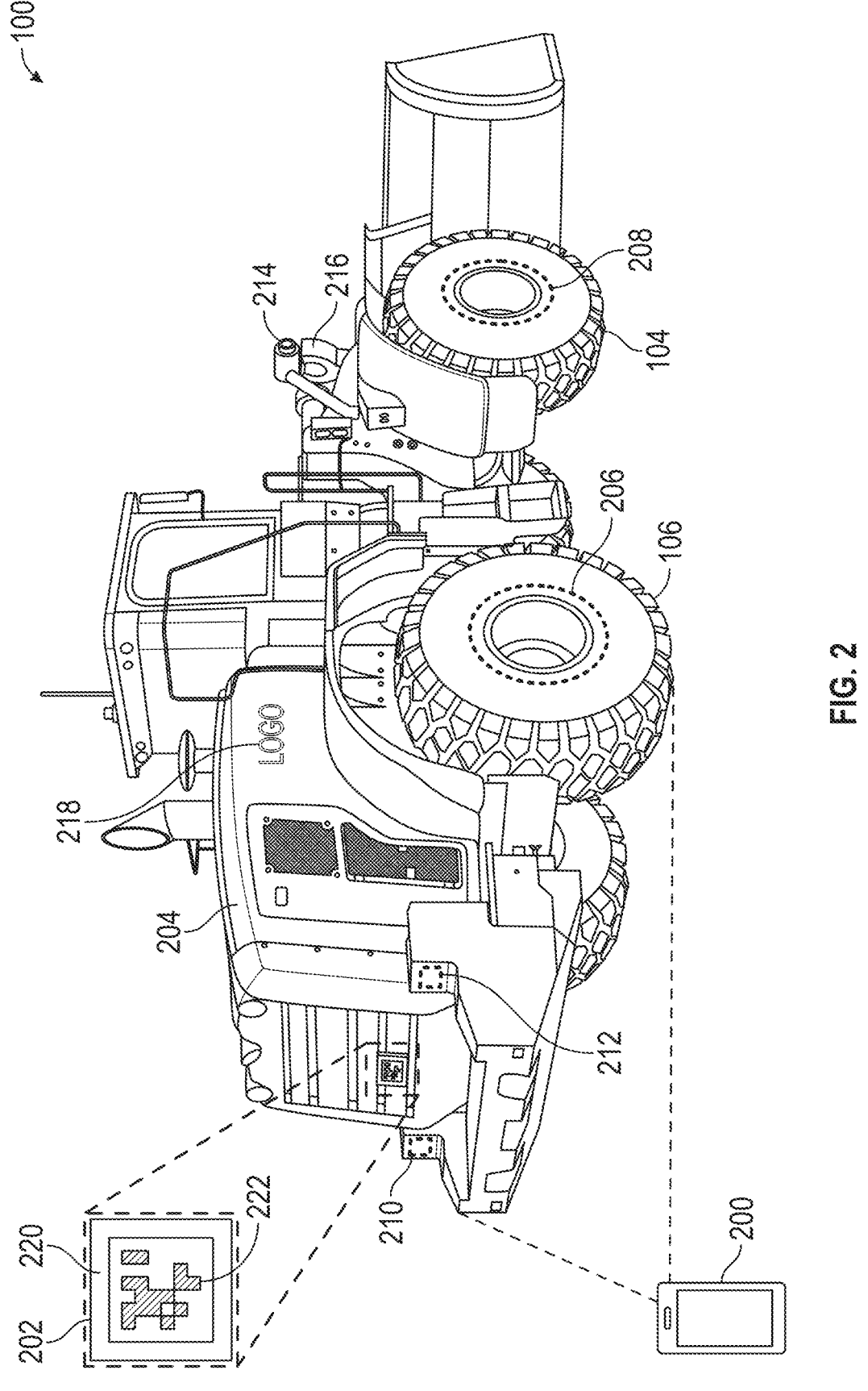
FIG. 2 is a rear perspective view of an example of the machine of FIG. 1 that may implement various techniques of this disclosure.

FIG. 2 is a rear perspective view of an example of the machine 100 of FIG. 1 that may implement various techniques of this disclosure. As shown in FIG. 2, a mobile device 200 is positioned so that a processor using an optical sensor of its digital camera system may detect, such as in a single image, a fiducial tag 202 (or fiducial marker) positioned on a housing of a remote sensing sensor. Examples of the mobile device 200 include a smartphone, a tablet computing device, and a laptop computer.

Figure 3:
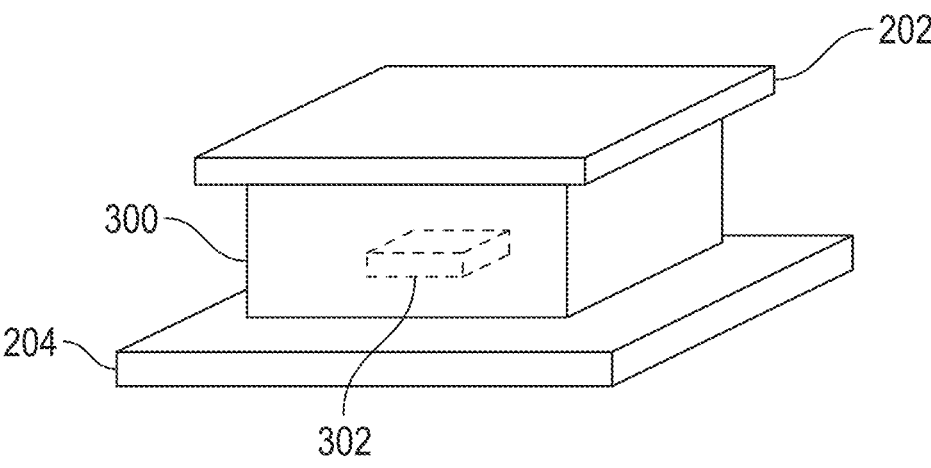
FIG. 3 is a perspective view depicting a housing of a remote sensing sensor mounted to the machine frame of the machine of FIG. 2.

In some examples, the fiducial tag 202 is an AprilTag. AprilTags are fiducial tags that include a black-and-white grid-based pattern that allows them to be easily recognized and decoded. Information may be embedded using the design of the visual pattern of the tag. The fiducial tag 202 is affixed to a housing of a remote sensing sensor, as shown in FIG. 3. The housing is affixed to the machine frame 204.

The mobile device 200, e.g., the processor using the optical sensor of a digital camera system of the mobile device 200, may first detect the fiducial tag 202 using its white square 220, which provides a position in space of the fiducial tag 202. Then, the processor using the optical sensor may detect the pattern 222 of the fiducial tag 202, which represents an embedded code that a processor may use to verify the fiducial tag 202. The embedded code may include a sensor ID, a location, a type, and the like.

In addition to the fiducial tag 202, the processor of the mobile device uses the optical sensor of the digital camera system to detect one or more features of the machine 100. Examples of features include the wheel hub 206, the wheel hub 208, the brake light 210, the brake light 212, the headlight 214, the turn signal 216, and the logo 218. In some examples, the processor may use a geometry of the one or more detected features to provide constraints for the coordinate transformation. Additionally or alternatively, in other examples, the processor may use additional aspects of the features, such as blinking brake lights, blinking headlights, and/or blinking turn signals.

As described in more detail below, the processor may determine various coordinate transformations to ultimately determine a coordinate transformation between the remote sensing sensor and the machine so as to calibrate the perception system 114 of FIG. 1, where the perception system 114 assists in the control of the machine 100.

FIG. 3 is a perspective view depicting a housing 300 of a remote sensing sensor 302 mounted to the machine frame 204 of the machine 100 of FIG. 2. The remote sensing sensor 302, such as a radar sensor, a lidar sensor, a sonar sensor, or a camera, are positioned within the housing 300. The fiducial tag 202 of FIG. 2 may be mounted to the housing 300. In some examples, as described below with respect to FIG. 10 and FIG. 11, the fiducial tag 202 may form part of or be coupled with the housing so as to be coupled with the remote sensing sensor 302.

Figure 4:
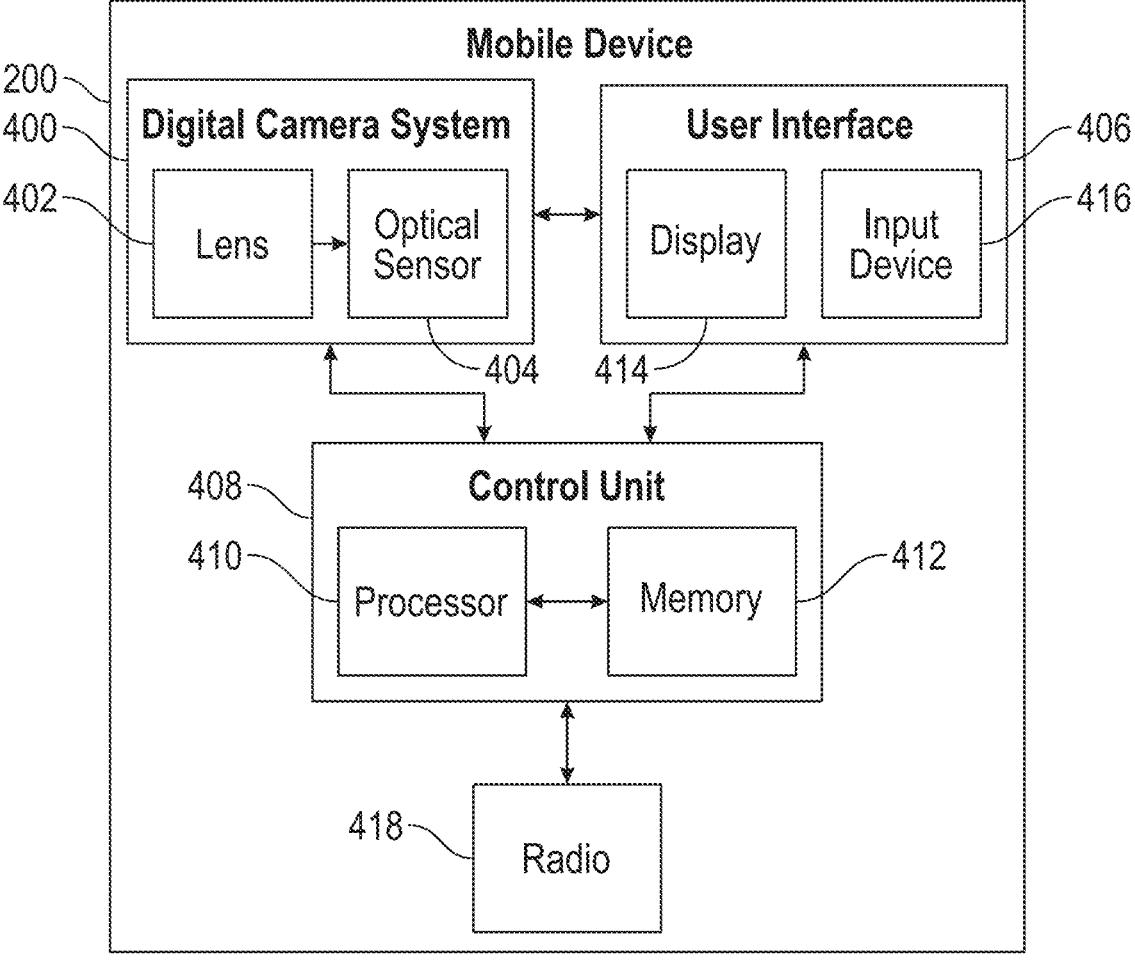
FIG. 4 is a simplified block diagram of an example of a mobile device that may implement various techniques of this disclosure.

FIG. 4 is a simplified block diagram of an example of a mobile device 200 that may implement various techniques of this disclosure. The mobile device 200 includes a digital camera system 400 that includes, among other things, a lens 402, which focuses light onto an optical sensor 404, such as an image sensor. The optical sensor converts the incoming light, received from the lens 402, into electronic signals that may be processed, such as by the processor 410 of the control unit 408, to generate data that may be used to generate digital images. An example of an optical sensor 404 is a CMOS (Complementary Metal-Oxide-Semiconductor) sensor. The digital images or digital data used to generate the digital images may be stored in the memory 412.

The mobile device 200 may also include a user interface 406 in electrical communication with the digital camera system 400. The user interface 406 includes a display 414, which serves as a digital viewfinder and a platform for reviewing and editing captured images and videos. Additionally, the user interface 406 includes an input device 416, such as a touchscreen, which allows users to interact directly with the digital camera system 400. The input device 416, such as a touchscreen, enables control over various settings and functions of the digital camera system 400, such as by responding to touch gestures and taps by a user, allowing users to easily adjust parameters, navigate menus, and capture images.

The control unit 408 is in electrical communication with both the digital camera system 400 and the control unit 408. The control unit 408 includes the processor 410 and the memory 412. The processor 410 executes various instructions stored in the memory 412 that control the digital camera system 400, process the raw data received from the optical sensor 404, and convert the raw data into usable images. In addition, the control unit 408 manages the user inputs from the user interface 406.

The memory 412 stores the algorithms, instructions, settings, as well as the images and videos captured. In addition, the memory 412 stores the information related to the various coordinate transformations described in this disclosure, which the processor 410 then uses to determine those coordinate transformations.

The mobile device 200 may further include a radio 418. The radio 418 may include one or more radios, such as cellular, Wi-Fi, and Bluetooth radios. In some examples, the radio 418 is configured to communicate with a radio in communication with the perception system 114 of FIG. 1.

FIG. 5 is a flow diagram of an example of a computer-implemented method 500 for calibrating a perception system of a machine in accordance with various techniques of this disclosure. At block 502, the method 500 detects, using an optical sensor of a digital camera system, a fiducial tag coupled with a remote sensing sensor, where the remote sensing sensor is mounted to a machine frame of the machine.

For example, a user may position the mobile device 200 of FIG. 2 such that the optical sensor 404 of the digital camera system 400 of FIG. 4 detects the fiducial tag 202 of FIG. 2. The fiducial tag 202 is coupled with the remote sensing sensor 302 of FIG. 3, such as to the housing 300 that encloses the remote sensing sensor 302. The digital camera system 400 of FIG. 4 may capture information defining an image that includes the detected fiducial tag 202 and the machine 100, which the processor 410 may store in the memory 412.

At block 504, the method 500 detects, using the optical sensor, a feature of the machine. For example, in the same image that was created at block 502, the optical sensor 404 of the digital camera system 400 of FIG. 4 detects a feature of the machine 100. Using the techniques of this disclosure, the feature does not include another sensor or fiducial tag. The digital camera system 400 of FIG. 4 may capture the information that includes the feature of the machine 100, which the processor 410 may store in the memory 412. In some examples, the processor 410 detects, from an image generated by the digital camera system, one or both of the first fiducial tag and the feature.

At block 506, the method 500 determines, using the fiducial tag, a first coordinate transformation between the optical sensor and the remote sensing sensor. For example, the processor 410 of the mobile device 200 of FIG. 4 may determine, based on the information of the fiducial tag 202, a first coordinate transformation between the optical sensor 404 and the remote sensing sensor 302. In some examples, the first coordinate transformation includes a coordinate transformation between the fiducial tag 202 and the remote sensing sensor 302, which is a constant and is previously determined and stored in the memory 412.

At block 508, the method 500 determines, using the feature, a second coordinate transformation between the optical sensor and the machine. For example, the processor 410 of the mobile device 200 of FIG. 4 may determine, using at least one wheel hub, a second coordinate transformation between the optical sensor 404 and the machine frame 204 of the machine 100.

At block 510, the method 500 determines, using the first coordinate transformation and the second coordinate transformation, a third coordinate transformation between the remote sensing sensor and the machine frame. For example, the processor 410 of the mobile device 200 of FIG. 4 may determine a third coordinate transformation between the remote sensing sensor 302 and the machine frame 204 of the machine 100. In this manner, the method 500 calibrates a coordinate frame of a remote sensing sensor 302 of the perception system 114 of the machine 100 with respect to a coordinate frame of the machine 100.

At block 512, the method 500 calibrates, using the third coordinate transformation, the perception system of the machine, where the perception system assists in the control of the machine. For example, the radio 418 of the mobile device 200 transmits information that defines the third coordinate transformation, such as data representing a positional and rotational offset of the coordinate frame of the remote sensing sensor 302 with respect to the coordinate frame of the machine 100. The positional and rotational offset information may include x, y, z, pitch, yaw, and/or roll information, for example. In other examples, a user may manually upload the third coordinate transformation information to the perception system 114 of the machine 100, such as by manually inputting information to the perception system 114 using a user interface of the perception system 114.

The actions of the method 500 may be performed by the processor 410 of the mobile device 200.

Figure 6:
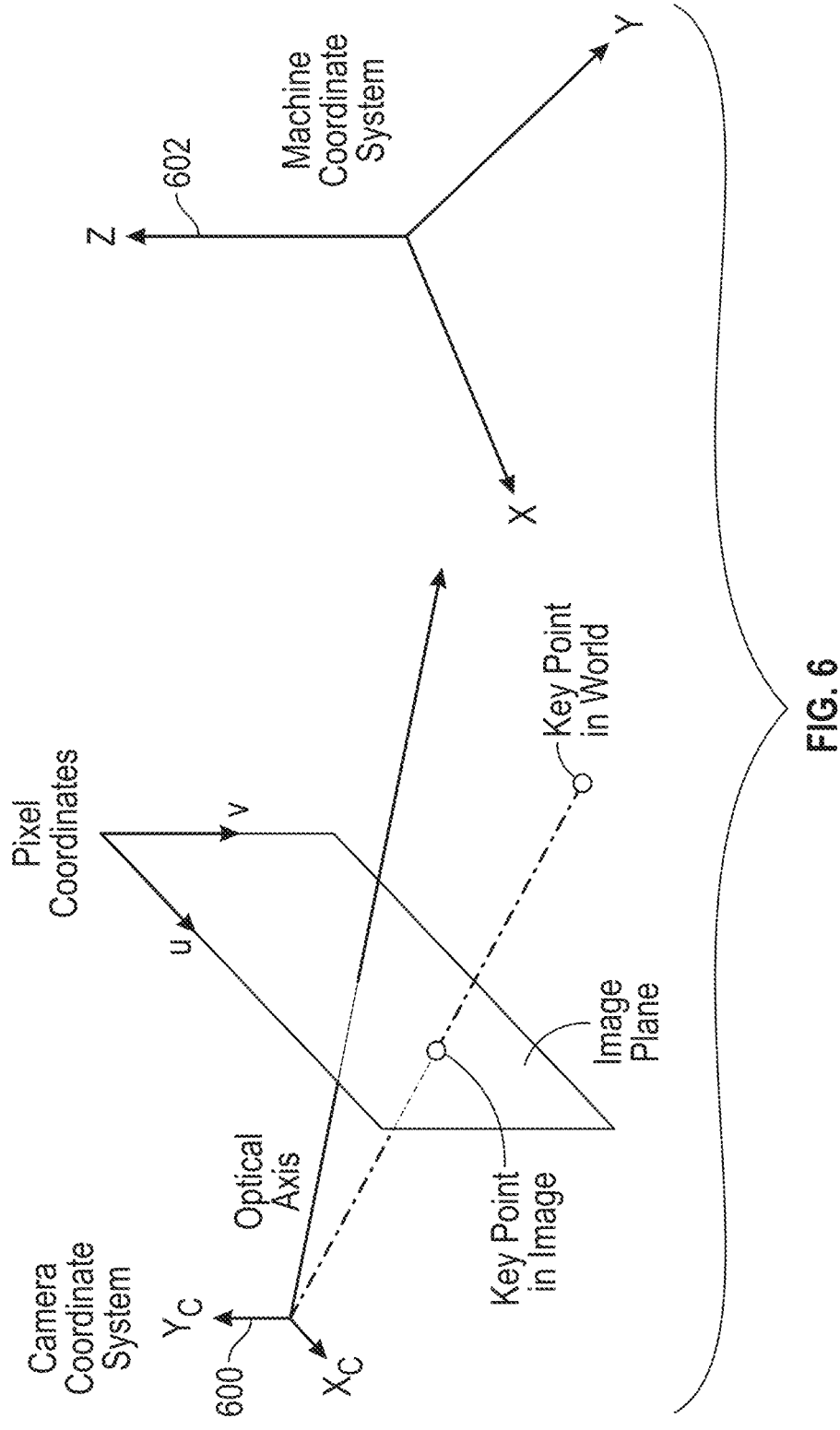
FIG. 6 graphically illustrates an example of a transformation between a first coordinate frame and a second coordinate frame.

FIG. 6 graphically illustrates an example of a transformation between a first coordinate frame and a second coordinate frame. In the example shown in FIG. 6, a first coordinate frame 600, e.g., of a camera or mobile device coordinate system, is transformed to a second coordinate frame 602, e.g., a machine coordinate frame.

In an example, a minimum of four machine geometric feature key points are detected in the camera image. Using the techniques of this disclosure, key points include fiducial tags and features of the machine. Using each key point's detected 2D pixel coordinates $(u_i, v_i)$, their corresponding pre-known 3D coordinates in the machine frame coordinate system $(X_i, Y_i, Z_i)$, and the intrinsic calibration parameters of the camera as inputs, a processor, such as the processor 410 of FIG. 4, determines the coordinate system transform between the camera and the machine frame coordinate system is using projective geometry.

Figure 7:
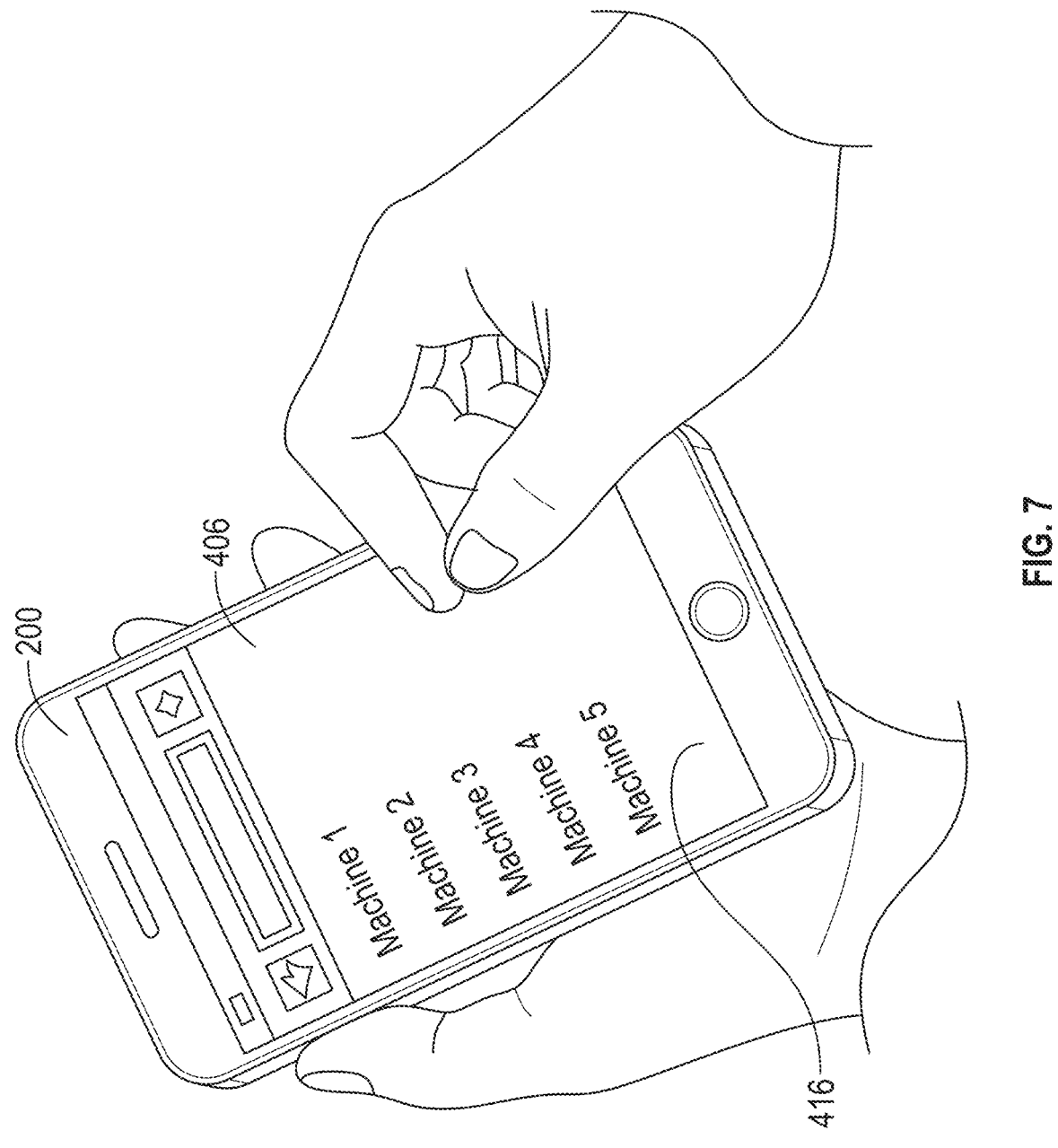
FIG. 7 depicts an example of a display of a mobile device that may implement various techniques of this disclosure.

FIG. 7 depicts an example of a display 414 of a mobile device 200 that may implement various techniques of this disclosure. In some examples, before performing the actions described with respect to the flow diagram in FIG. 5, the mobile device 200 displays, on the user interface 406, a model of the machine 100. For example, in FIG. 7, five different models are displayed on the user interface 406, which are labeled "Machine 1" through "Machine 5".

The mobile device 200 may then receive, as user input to the user interface 406, a selection of the model of the machine. For example, the user may tap the input device 416, such as a touchscreen, of the user interface 406, to select the model of the machine. After the model is selected, the processor 410 may then retrieve from the memory 412 of FIG. 4 a coordinate transformation information that is specific to the selected model, which the processor 410 may then use in the coordinate transformation actions of FIG. 5.

Figure 8:
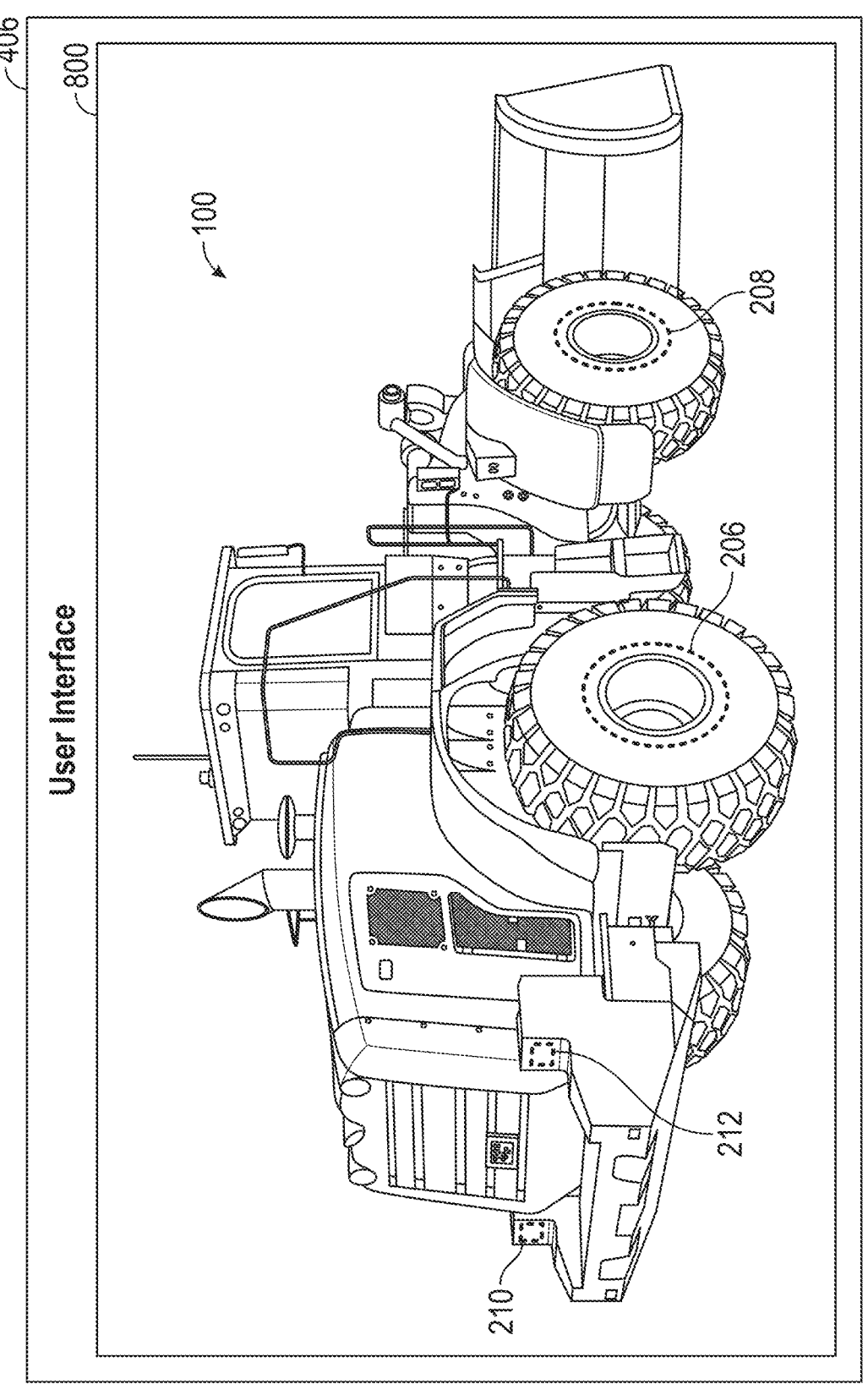
FIG. 8 is a rear perspective view of the example of the machine of FIG. 2 positioned within an outline displayed on a display of a mobile device.

FIG. 8 is a rear perspective view of the example of the machine 100 of FIG. 2 positioned within an outline displayed on a display of a mobile device. In FIG. 8, the user interface 406, e.g., display 414, of the mobile device 200 of FIG. 2 displays an outline 800 within which the user positions the entire machine 100. Then, the processor 410 using the optical sensor 404 of the digital camera system 400 of FIG. 4 detects that the machine 100 is positioned within the outline 800, such as within the outline without extending beyond the outline. For example, the processor 410 uses edge detection to analyze and process the image by converting it to grayscale and then detecting edges, shapes, and alignments to confirm that the machine 100 is properly aligned within the outline 800, e.g., capture frame, for accurate processing for coordinate transformation.

The use of the outline 800 to guide the user in positioning the machine 100 within the view of the digital camera system is an example of "seeding." Seeding, in this context, refers to providing users with a visual guide or template. Displaying the outline 800 within which the machine 100 should be positioned aligns the machine 100 for optimal recognition and processing by the mobile device 200. This helps ensure that the image is properly framed and meets the requirements for the mobile device 200 to accurately capture and process the details of the fiducial tag and the features of the machine 100.

In some examples, the user interface 406 receives, as user input, a location on the user interface of the feature of the machine. For example, in response to a prompt from the mobile device 200, a user may use the input device 416 of FIG. 4, e.g., a touchscreen, and tap, outline, or otherwise highlight the features of the machine 100, such as one or more of the wheel hub 206, the wheel hub 208, the brake light 210, and the brake light 212 of FIG. 8 or any of the other features described and shown above with respect to FIG. 2. This "user assistance" helps the processor focus on a specific area or piece of information. This may be particularly useful in improving the accuracy and speed of data extraction processes, such as optical character recognition (OCR) related to a logo feature or locating a geometric feature such as a wheel hub.

Selection of a model of the machine 100, such as described above with respect to FIG. 7, in combination with the user highlighting of the feature, may help the processor 410 more quickly identify the parameters of the coordinate transformation needed to align the reference frames.

The present inventors have recognized that for larger machines, it may be challenging to find a vantage point for the mobile device 200 from which both the feature(s) and the fiducial tag are detectible. The fiducial tag may be too small and hard to detect at a large distance with a typical smart phone camera resolution. A solution is described below with respect to FIG. 9.

Figure 9:
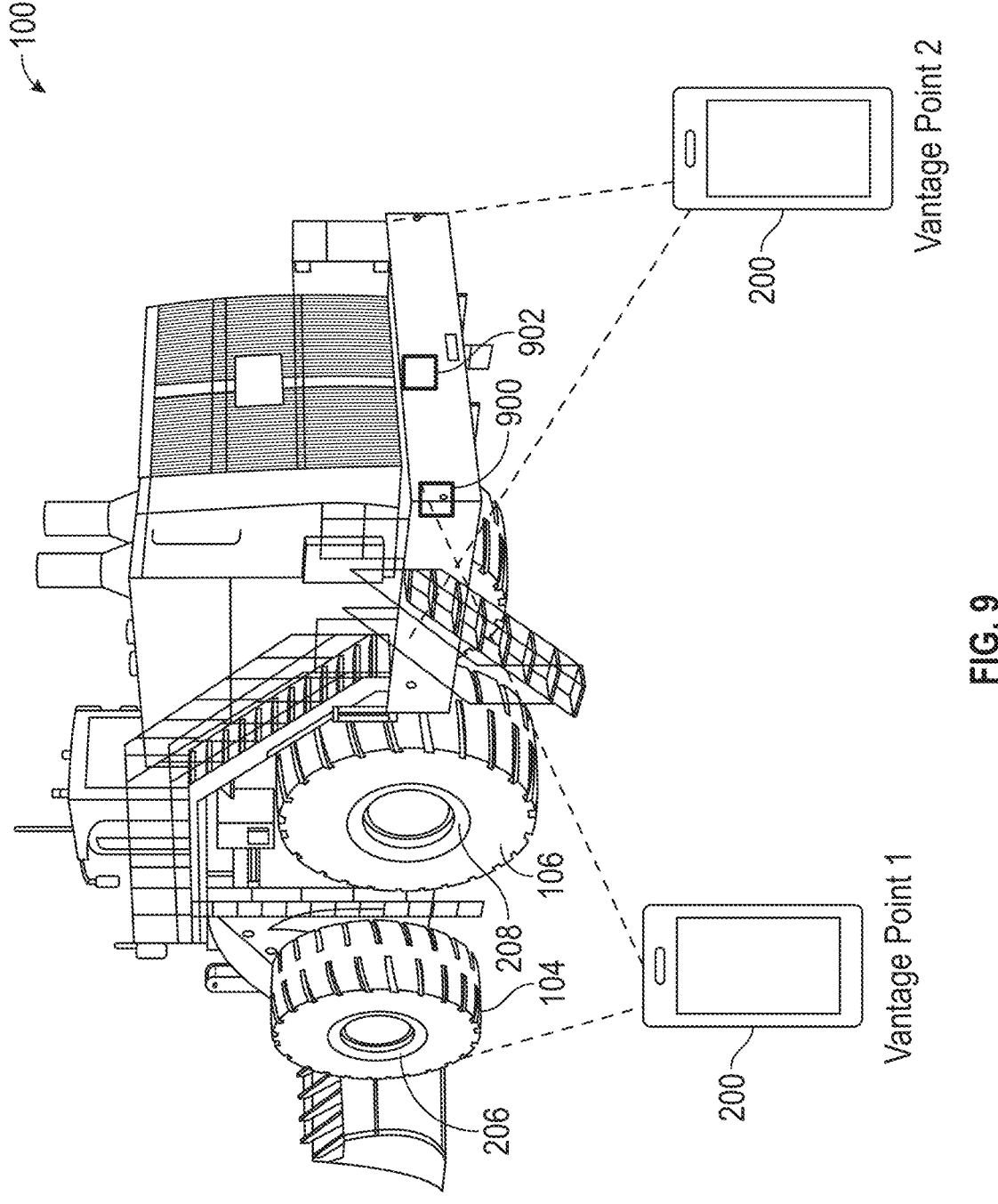
FIG. 9 is another rear perspective view of the machine of FIG. 1.

FIG. 9 is another rear perspective view of the machine 100. Using the techniques of this disclosure, an intermediate fiducial tag is placed at an intermediate location, e.g., on a corner of a bumper of the machine 100. During calibration, the intermediate tag remains stationary. In some examples, the calibration process may be broken up into multiple images that the mobile device 200 may take at closer vantage points. A first image contains both the fiducial tag mounted to the housing of the remote sensing sensor and the intermediate tag and a second image contains the intermediate tag and the feature(s) of the machine 100. The calibration may be divided further by introducing more than one intermediate fiducial tag.

As shown in FIG. 9, a mobile device 200 is positioned at a first vantage point ("vantage point 1"). The mobile device 200, e.g., a processor 410 of the mobile device 200, detects, using a first image generated by an optical sensor of a digital camera system of the mobile device 200 at the first vantage point, a first fiducial tag 900 coupled with a remote sensing sensor and a second fiducial tag 902 mounted on a machine frame 204 of the machine 100. The remote sensing sensor is mounted to the machine frame 204, such as shown in FIG. 3. The first fiducial tag 900 may be similar to the fiducial tag 202 of FIG. 2, e.g., an AprilTag. The first fiducial tag 900 is affixed to a housing of the remote sensing sensor, as shown in FIG. 3 and the housing is coupled with the machine frame 204.

The mobile device 200 is then positioned at a second vantage point ("vantage point 2"). The mobile device 200, e.g., a processor 410 of the mobile device 200, detects, using a second image generated by the optical sensor of the digital camera system at the second vantage point, the second fiducial tag 902 and a feature of the machine, e.g., the wheel hub 206, the wheel hub 208, and/or the other features described and shown above with respect to FIG. 2.

As described above, the processor may determine various coordinate transformations to ultimately determine a coordinate transformation between the remote sensing sensor and the machine frame so as to calibrate the perception system 114 of FIG. 1, where the perception system 114 assists in the control of the machine 100. The processor 410 determines, using the first fiducial tag 900 and the second fiducial tag 902, a first coordinate transformation between the optical sensor of the digital camera system of the mobile device 200 and the remote sensing sensor. The first coordinate transformation may include a coordinate transformation between the first fiducial tag 900 and the second fiducial tag 902, e.g., a constant that is previously determined and stored in the memory 412 of the mobile device 200.

The processor 410 determines, using the second fiducial tag 902 and the feature, a second coordinate transformation between the optical sensor and the machine frame 204. The second coordinate transformation may include a coordinate transformation between the second fiducial tag 902 and the feature, e.g., a constant that is previously determined and stored in the memory 412 of the mobile device 200.

Then, the processor 410 determines, using the first coordinate transformation and the second coordinate transformation, a third coordinate transformation between the remote sensing sensor and the machine. For example, the processor 410 of the mobile device 200 of FIG. 4 may determine a third coordinate transformation between the remote sensing sensor 302 and the machine 100. In this manner, the processor 410 generates a third coordinate transformation to calibrate a coordinate frame of a remote sensing sensor 302 of the perception system 114 of the machine 100 with respect to a coordinate frame of the machine 100.

The third coordinate transformation is then used for calibration so as to control the perception system of the machine. For example, the radio 418 of the mobile device 200 transmits information that defines the third coordinate transformation, such as data representing a positional and rotational offset of the coordinate frame of the remote sensing sensor 302 with respect to the coordinate frame of the machine 100. The positional and rotational offset information may include x, y, z, pitch, yaw, and/or roll information, for example. In other examples, a user may manually upload the third coordinate transformation information to the perception system 114 of the machine 100, such by manually inputting information to the perception system 114 using a user interface of the perception system 114.

Figure 10:
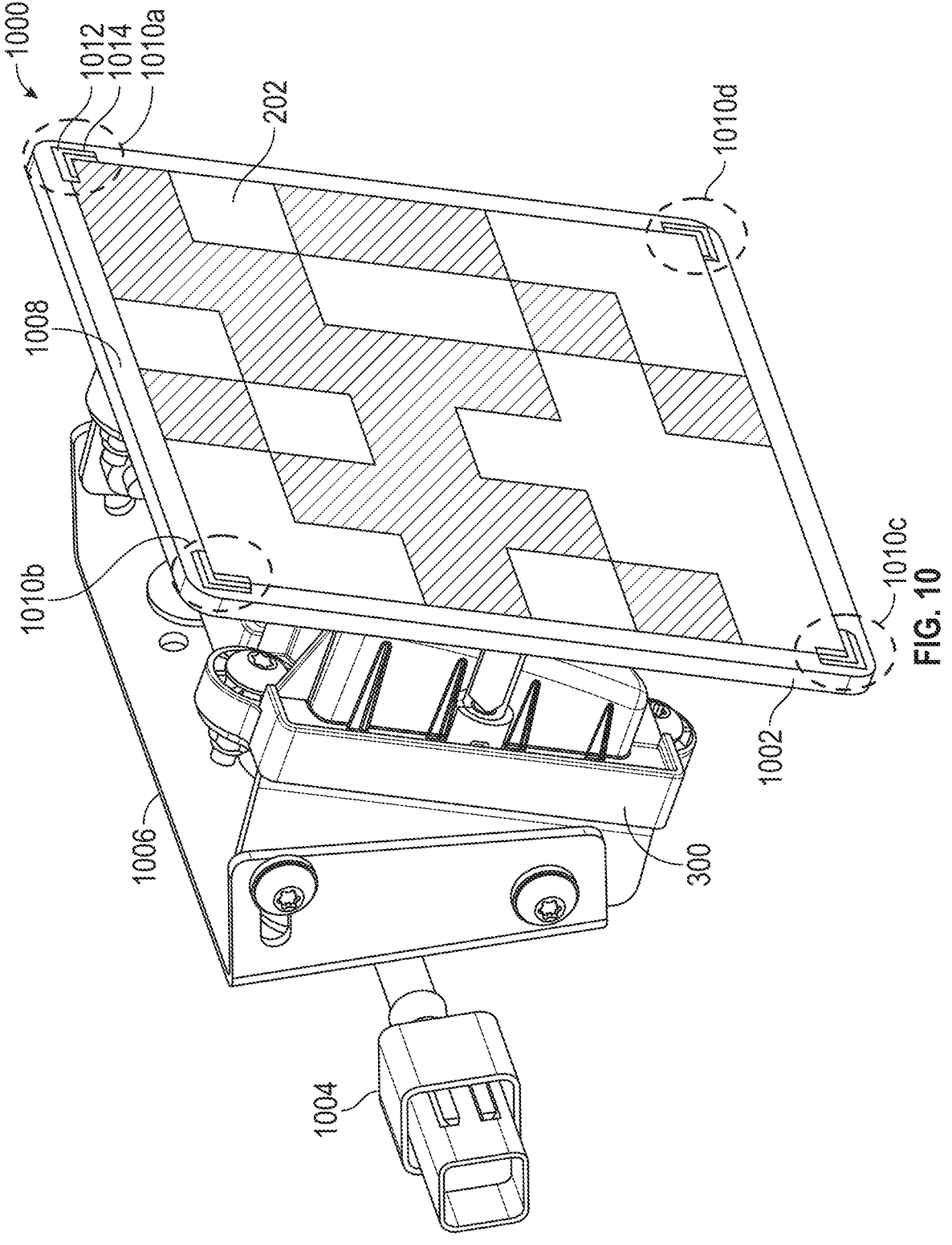
FIG. 10 is a perspective view of an example of a remote sensing sensor assembly for a perception system of a machine.

FIG. 10 is a perspective view of an example of a remote sensing sensor assembly 1000 for a perception system of a machine. The remote sensing sensor assembly 1000 includes a housing 300 and a remote sensing sensor, shown in FIG. 3 as the remote sensing sensor 302, positioned within housing 300. The remote sensing sensor assembly 1000 includes a cable 1004 coupled between the remote sensing sensor 302 of FIG. 3 and the perception system 114 of FIG. 1. The remote sensing sensor assembly 1000 may be affixed to the machine frame 204 of FIG. 2 using a bracket 1006 coupled with the housing 300.

The housing 300 includes a surface 1002 having a first portion 1008 and a second portion 1010a. The first portion 1008 defines a first plane, e.g., horizontal plane, such as a flat surface. The second portion 1010a extends beyond the first plane and may be positioned adjacent a corner of the surface 1002.

In some examples, such as shown in FIG. 10, the second portion 1010a is a raised structure that extends vertically away from the first portion 1008. In some examples, the second portion 1010a as an internal corner that is created with a high-precision manufacturing process like top-level machining or injection molding.

In some examples, the second portion 1010a is configured to orient a fiducial tag 202 that is affixed to the surface 1002. For example, the fiducial tag 202 is printed on a rigid substrate that is aligned to the raised structure and affixed with adhesive to the surface 1002.

In some examples, the second portion 1010a is a raised structure that includes a first raised portion 1012 and second raised portion 1014, where the first raised portion 1012 extends away from the second raised portion 1014 at a 90-degree angle.

In some examples, the surface 1002 includes at least two second portions positioned adjacent to corresponding corners of the surface. For example, the surface 1002 of FIG. 10 depicts a second portion 1010b, a second portion 1010c, and a second portion 1010d that are adjacent to corresponding corners of the surface 1002.

Figure 11:
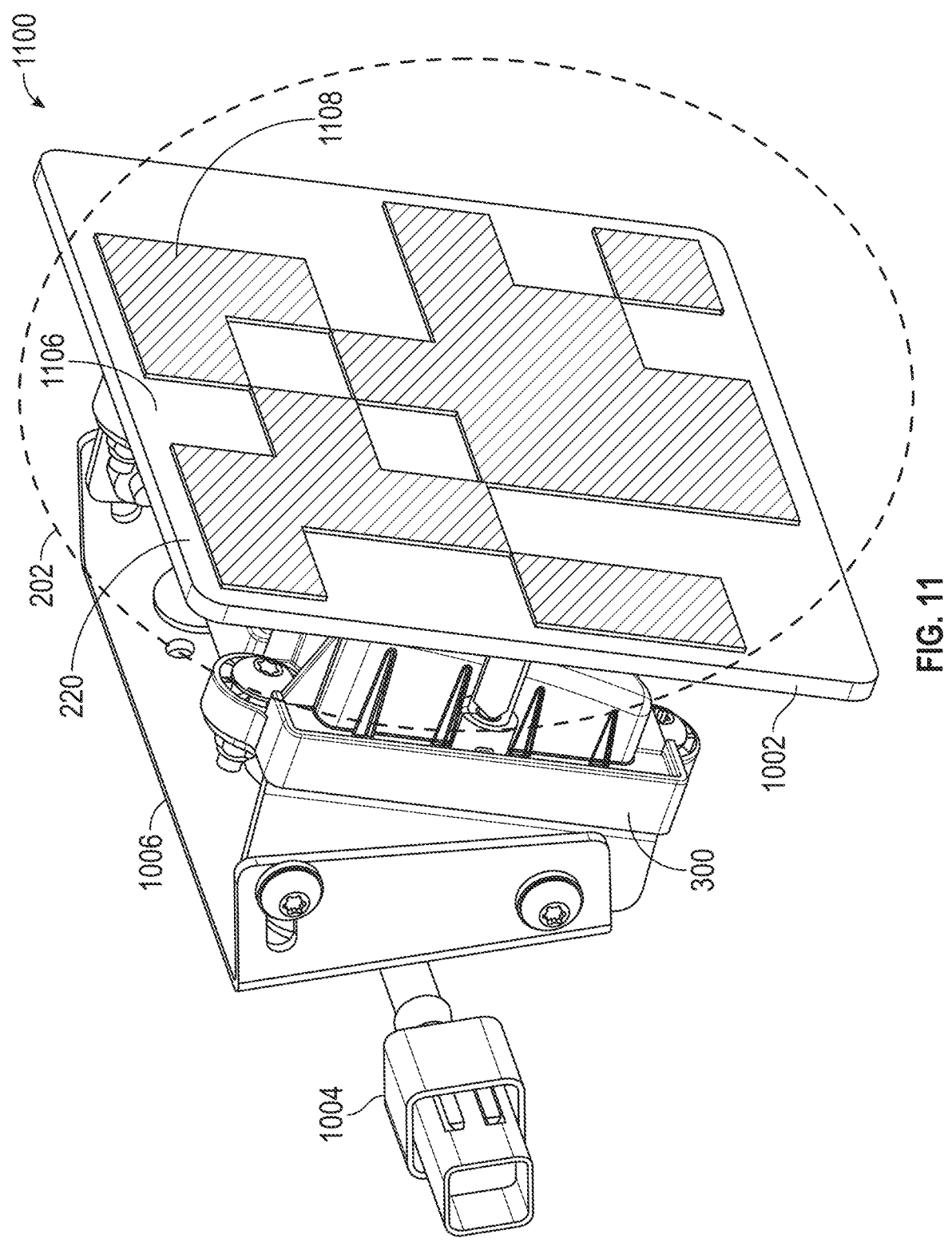
FIG. 11 is a perspective view of another example of a remote sensing sensor assembly for a perception system of a machine.

FIG. 11 is a perspective view of another example of a remote sensing sensor assembly 1100 for a perception system of a machine. The remote sensing sensor assembly 1100 is similar to the remote sensing sensor assembly 1000 of FIG. 10, except that the fiducial tag 202 is embedded or formed in the surface 1002 rather than on a separate structure that is adhered to the surface 1002. Using the techniques of this disclosure, a relief of the fiducial tag 202 is manufactured into the surface 1002, such as using a high precision manufacturing process. A coating of the desired color, e.g., black or some other color that would result in sufficient contrast with the flat portion, may then be applied to the raised portion of the pattern 222 of the fiducial tag 202.

The remote sensing sensor assembly 1100 includes a housing 300 and a remote sensing sensor, shown in FIG. 3 as the remote sensing sensor 302, positioned within the housing 300. The remote sensing sensor assembly 1100 includes a cable 1004 coupled between the remote sensing sensor 302 of FIG. 3 and the perception system 114 of FIG. 1. The remote sensing sensor assembly 1000 may be affixed to the machine frame 204 of FIG. 2 using a bracket 1006 coupled with the housing 300.

The housing 300 includes a surface 1002 having a first portion 1106, e.g., a white portion of the fiducial tag 202, and a second portion 1108, e.g., a black portion of the fiducial tag 202. The fiducial tag 202 includes the white square 220, which provides a position in space of the fiducial tag 202 and a pattern, e.g., such as pattern 222 of FIG. 2, defined by the first portion 1106 and the second portion 1108.

The first portion 1106 defines a first plane, e.g., horizontal plane, such as a flat surface. The second portion 1108 extends beyond the first plane. For example, the second portion 1108 is a raised structure that extends vertically away from the first portion 1106.

In some examples, a multi-material 3D printer embeds or forms the fiducial tag 202 directly into the surface 1002 during manufacturing. The black and white portions of the fiducial tag 202 may be manufactured into the surface 1002 in a single process, both minimizing time and cost. Additionally, this technique may result in more accurate and reliable positioning of the fiducial tag 202 relative to the remote sensing sensor due to the computer-controlled process of 3D printing. The flexibility and low-cost aspect of 3D printing the fiducials also enables different fiducial tags to be manufactured at a low cost.

INDUSTRIAL APPLICABILITY

Techniques for calibrating the coordinate frame of a remote sensing sensor of a perception system of a machine with respect to the coordinate frame of the machine, as described above, have industrial applicability across numerous sectors. Calibration techniques ensure that the data collected by the remote sensing sensor is accurately mapped to the physical world as understood by the machine's operational framework. This is essential for the precise operation of machines in industries such as mining, construction, and automotive.

In the mining, construction, and automotive industries, including in the development of autonomous vehicles, calibration of remote sensing sensors like LIDAR, radar, sonar, and cameras is fundamental. These sensors gather important data that a vehicle's perception system uses to understand its surroundings, make decisions, and navigate safely. Proper calibration aligns the sensor data with the vehicle's coordinate frame, ensuring that the vehicle accurately perceives other vehicles, obstacles, and pedestrians in relation to its own position and trajectory. This alignment is important for safety and reliability.

Various Notes

Each of the non-limiting claims or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more claims thereof), either with respect to a particular example (or one or more claims thereof), or with respect to other examples (or one or more claims thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more claims thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A computer-implemented method for calibrating a perception system of a machine, the method comprising:

detecting, using an optical sensor of a digital camera system, a first fiducial tag coupled with a remote sensing sensor, wherein the remote sensing sensor is coupled with a machine frame of the machine;

detecting, using the optical sensor, a feature of the machine;

determining, using the first fiducial tag, a first coordinate transformation between the optical sensor and the remote sensing sensor;

determining, using the feature, a second coordinate transformation between the optical sensor and the machine frame;

determining, using the first coordinate transformation and the second coordinate transformation, a third coordinate transformation between the remote sensing sensor and the machine frame; and calibrating, using the third coordinate transformation, the perception system of the machine.

2. The computer-implemented method of claim 1, wherein the feature includes a traction component, a brake light, a headlight, a turn signal, or a logo.

3. The computer-implemented method of claim 1, wherein the digital camera system is part of a mobile device.

4. The computer-implemented method of claim 3, wherein detecting, using the optical sensor of the digital camera system, the first fiducial tag mounted on the remote sensing sensor includes:

detecting, from an image generated by the digital camera system, the first fiducial tag and the feature.

5. The computer-implemented method of claim 1, comprising:

displaying, on a user interface, a model of the machine; and receiving, as user input to the user interface, a selection of the model of the machine.

6. The computer-implemented method of claim 1, comprising:

displaying, on a user interface, an outline; and detecting that the machine is positioned within the outline.

7. The computer-implemented method of claim 6, wherein detecting, using the optical sensor, the feature of the machine includes:

detecting, using the optical sensor, the feature of the machine when the machine is positioned within the outline without extending beyond the outline.

8. The computer-implemented method of claim 1, comprising:

receiving, as user input to the user interface, a location on the user interface of the feature of the machine.

9. The computer-implemented method of claim 1, wherein the first coordinate transformation includes a transform between the first fiducial tag and the remote sensing sensor.

10. A computer-implemented method for calibrating a perception system of a machine, the method comprising:

detecting, using a first image generated by an optical sensor of a digital camera system, a first fiducial tag coupled with a remote sensing sensor and a second fiducial tag mounted on a machine frame of the machine, wherein the remote sensing sensor is coupled with the machine frame;

detecting, using a second image generated by the optical sensor of the digital camera system, the second fiducial tag and a feature of the machine;

determining, using the first fiducial tag and the second fiducial tag, a first coordinate transformation between the optical sensor and the remote sensing sensor;

determining, using the second fiducial tag and the feature, a second coordinate transformation between the optical sensor and the machine frame;

determining, using the first coordinate transformation and the second coordinate transformation, a third coordinate transformation between the remote sensing sensor and the machine frame; and calibrating, using the third coordinate transformation, the perception system of the machine.

11. The computer-implemented method of claim 10, wherein the feature includes a traction component, a brake light, a headlight, a turn signal, or a logo.

12. The computer-implemented method of claim 10, wherein the digital camera system is part of a mobile device.

13. The computer-implemented method of claim 12, comprising:

displaying, on a user interface, a model of the machine; and receiving, as user input to the mobile device, a selection of the model of the machine.

14. The computer-implemented method of claim 10, comprising:

receiving, as user input to the user interface, a location on the user interface of the feature of the machine.

15. The computer-implemented method of claim 10, comprising:

displaying, on a user interface, an outline; and detecting that the machine is positioned within the outline.

* * * * *